(12) United States Patent
Hsieh et al.

(10) Patent No.: US 7,940,430 B2
(45) Date of Patent: May 10, 2011

(54) METHOD OF CALIBRATING A TEST CHART AND A SCANNING DEVICE

(75) Inventors: Ming-Hsien Hsieh, Banciao (TW); Sheng Peng Hsu, Dounan Township, Yunlin County (TW); Chin Ping Yang, Ligang Township, Pingtung County (TW)

(73) Assignee: Avision Inc. (TW)

( * ) Notice: Subject to any disclaimer, the term of this patent is extended or adjusted under 35 U.S.C. 154(b) by 951 days.

(21) Appl. No.: 11/882,440

(22) Filed: Aug. 1, 2007

(65) Prior Publication Data

US 2008/0030795 A1 Feb. 7, 2008

(30) Foreign Application Priority Data

Aug. 3, 2006 (TW) ................................ 95128421 A

(51) Int. Cl.
*H04N 1/04* (2006.01)
(52) U.S. Cl. .......... 358/406; 358/474; 358/475; 358/497
(58) Field of Classification Search ............ 358/406, 358/474, 475, 497, 498
See application file for complete search history.

(56) References Cited

U.S. PATENT DOCUMENTS

| 6,853,438 | B2 * | 2/2005 | Kiening | 352/244 |
| 7,643,680 | B2 * | 1/2010 | Huang | 382/167 |
| 2004/0057082 | A1 * | 3/2004 | Liu | 358/406 |
| 2005/0030601 | A1 | 2/2005 | Smith et al. | |
| 2006/0001921 | A1 | 1/2006 | Bailey et al. | |
| 2006/0103900 | A1 | 5/2006 | Huang | |

FOREIGN PATENT DOCUMENTS

| TW | 1253287 | 12/1993 |
| TW | 518881 | 1/2003 |
| TW | 1248288 | 1/2006 |
| TW | 200618604 | 1/2006 |

* cited by examiner

*Primary Examiner* — Houshang Safaipour

(57) ABSTRACT

A method of calibrating a test chart is provided. First, a reference scanning device scans a reference test chart to obtain a plurality of reference optical density (OD) values. The reference test chart includes a plurality of reference blocks. Then, the reference scanning device scans a test chart to obtain a plurality of first OD values. The test chart includes a plurality of blocks, which corresponds to the reference blocks. Next, a compensation function derived from respectively converting the first OD values into the reference OD values is obtained.

8 Claims, 3 Drawing Sheets

METHOD OF CALIBRATING A TEST CHART AND A SCANNING DEVICE

BACKGROUND OF THE INVENTION

1. Field of Invention

The invention relates to a method of calibrating a test chart and a scanning device, and more particularly to a method of calibrating a scanning device and a test chart which is formed by way of printing.

2. Related Art

A conventional scanner has to be calibrated before the scanner is shipped out. The optical properties of the scanner, such as the luminance distribution property of a light source of the scanner, the sensitivities of an image sensor of the scanner or a combination thereof, may be calibrated according to a standard reference test chart. The scanned image is free of distortion after this calibration work has been done.

FIG. 1 is a schematic illustration showing a conventional test chart. In order to manufacture a conventional test chart 100, several photographs of different optical densities (ODs) are developed and printed. Then, the photographs are cut into several blocks 111 to 116, which are then adhered to a base plate 110. However, four corners (or at least one corner 112A) of each of the blocks 111 to 116 tend to raise from the base plate 110 after a period of time, thus failing to provide a standard test chart for the calibration of the scanner. In addition, the cost of manufacturing one conventional test chart is very high, around 330 U.S. dollars, and not suitable for mass production.

So, the conventional test chart cannot be adapted to be used in the calibration of the sheet-fed scanner.

SUMMARY OF THE INVENTION

It is therefore an object of the invention to provide a method of calibrating a scanning device and a test chart having a base plate on which a plurality of blocks of different optical densities is printed, where the test chart is calibrated with another test chart having a plurality of reference blocks of different optical densities and a compensation function for calibrating a scanning device is obtained.

To achieve the above-identified object, the invention provides a method of calibrating a test chart. The method includes the steps of: scanning, by a reference scanning device, a plurality of reference blocks of a reference test chart to obtain a plurality of reference optical density (OD) values; scanning, by the reference scanning device, a plurality of blocks of the test chart to obtain a plurality of first OD values, wherein the blocks correspond to the reference blocks of the reference test chart; and obtaining a compensation function derived from respectively converting the first OD values into the reference OD values.

The invention also provides a method of calibrating a scanning device, the method comprising the steps of: scanning, by a scanning device, a test chart to obtain a plurality of OD values; converting the OD values into a plurality of corrected OD values according to a compensation function, wherein a reference test chart and the test chart are scanned by a reference scanning device to obtain the compensation function; and calibrating an optical property of the scanning device according to the corrected OD values.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
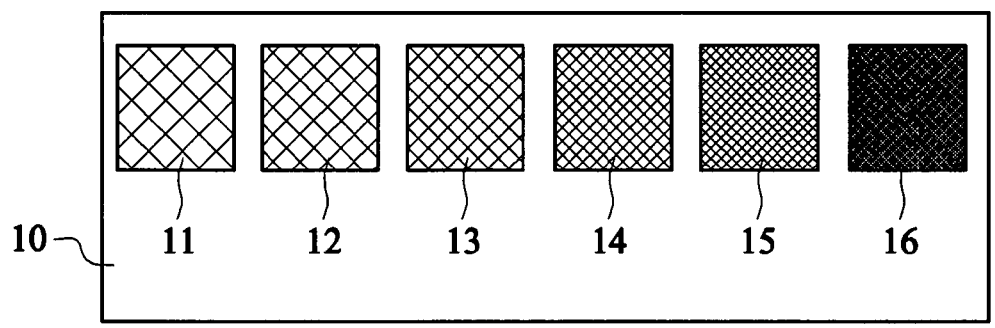
FIG. 2 is a schematic illustration showing a test chart according to the invention.

FIG. 2 is a schematic illustration showing a test chart according to the invention. In order to improve the conventional drawbacks, the invention provides another standard test procedure. A test chart 1 used in this procedure includes a base plate 10 on which several OD blocks 11 to 16 are directly printed. Thus, the OD blocks and the base plate 10 of the test chart 1 have the same thickness, and four corners of each of the OD blocks 11 to 16 do not raise from the base plate 10 after a period of time. The test chart 1 is suitable for the calibration of the flatbed scanner as well as the calibration of the sheet-fed scanner, and has the lower cost, approximately 73 U.S. dollars.

However, the OD blocks 11 to 16 of the test chart 1 do not render colors or patterns as precise as those of the OD blocks formed by way of developing and printing. Thus, the invention provides a method for calibrating the test chart 1.

Figure 1:
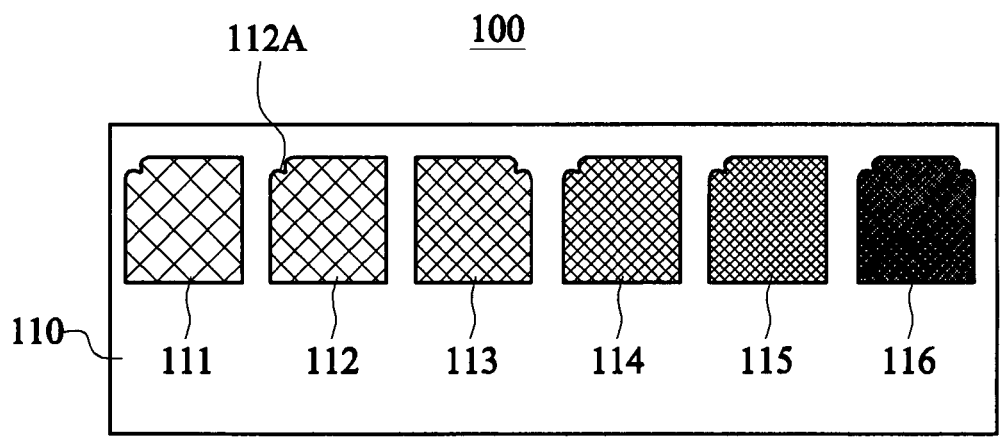
FIG. 1 is a schematic illustration showing a conventional reference test chart.
Figure 3:
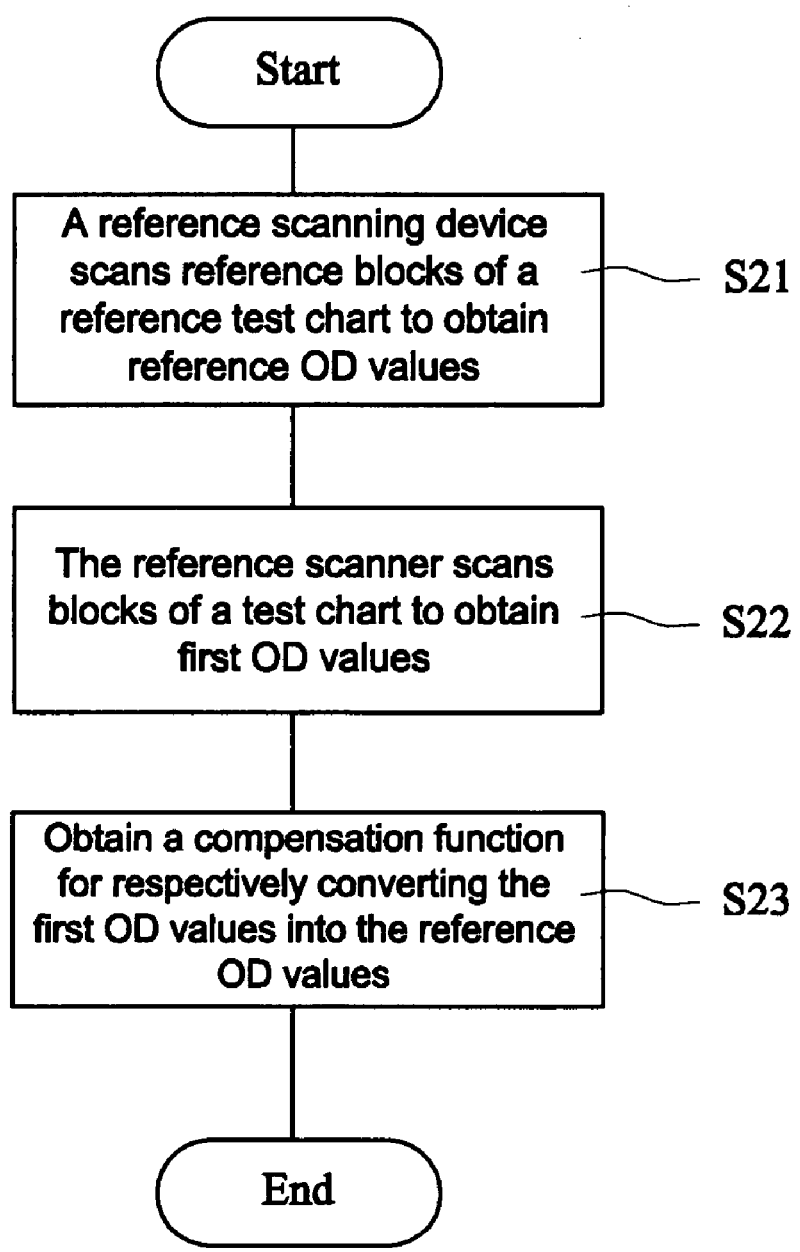
FIG. 3 is a flow chart showing a method of calibrating a test chart according to a first embodiment of the invention.

FIG. 3 is a flow chart showing a method of calibrating the test chart according to a first embodiment of the invention. Referring to FIGS. 1 to 3, the method of calibrating the test chart includes the following steps.

In step S21, a reference scanning device scans a plurality of reference blocks 111 to 116 of a reference test chart 100 to obtain a plurality of reference OD values, G1 to G6. Each of the reference blocks 111 to 116 has a different optical density. The so-called reference scanning device represents a scanner, which has undergone calibration and passed inspections. The reference scanning device is a flatbed scanner or a sheet-fed scanner.

In step S22, the reference scanning device scans a plurality of OD blocks 11 to 16 of the test chart 1 to obtain a plurality of first OD values, g1 to g6. The OD blocks 11 to 16 correspond to the reference blocks 111 to 116 and each has a different optical density.

In step S23, a compensation function derived from respectively converting the first OD values g1 to g6 into the reference OD values G1 to G6 is obtained. For example, if the grayscale value of G1 is 248, and the grayscale value of g1 is 240, the compensation function is configured to add 8 to g1 to obtain the correct grayscale value. In addition to its simpler manufacturing process and lower cost, the test chart 1, when being used in conjunction with the compensation function, is not only suitable for mass production, also can be provided as a calibration reference for the scanner.

Figure 4:
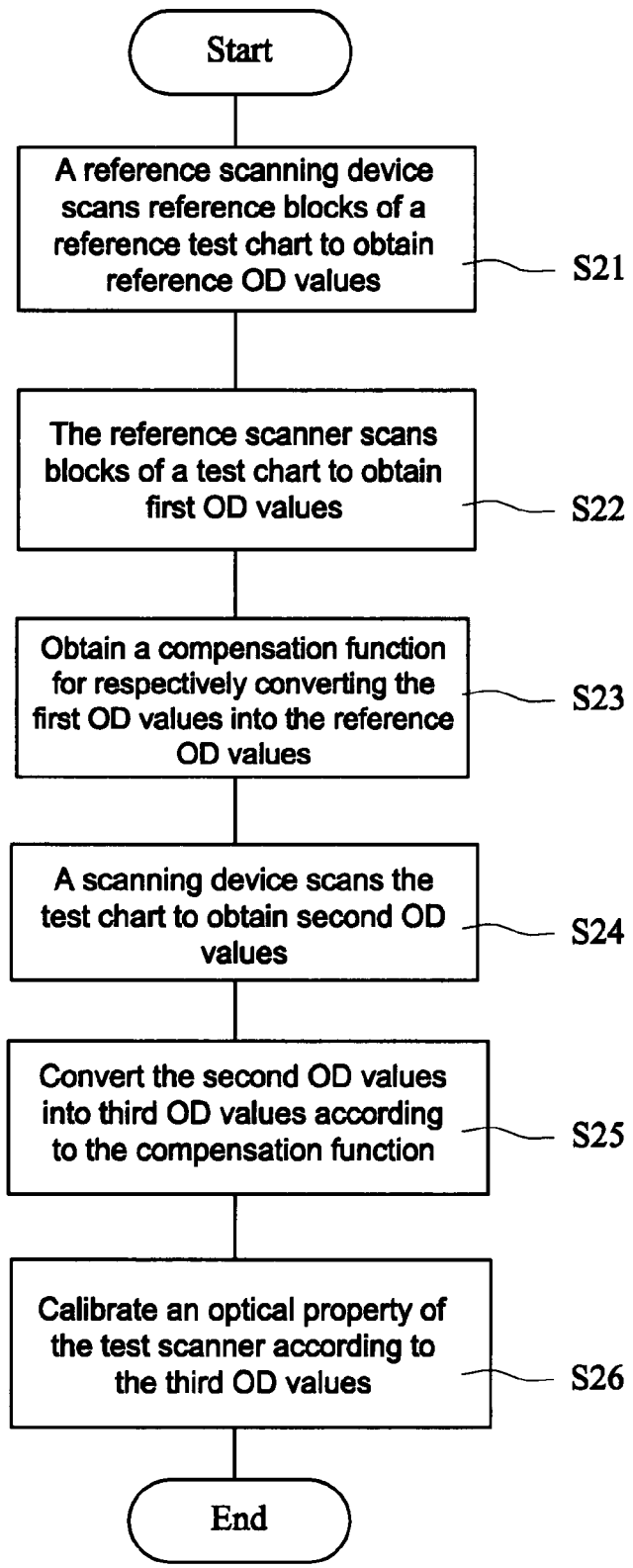
FIG. 4 is a flow chart showing a method of calibrating a scanning device according to a second embodiment of the invention.

FIG. 4 is a flow chart showing a method of calibrating a scanning device according to a second embodiment of the invention. As shown in FIG. 4, this embodiment is similar to the first embodiment except that this embodiment further includes steps S24 to S26.

In step S24, the scanning device scans the test chart 1 to obtain a plurality of second OD values h1 to h6. The scanning device is a flatbed scanner or a sheet-fed scanner.

In step S25, the OD values h1 to h6 are converted into a plurality of third OD values, or referred to as corrected OD values hereunder, I1 to I6 according to a compensation function, which is obtained by scanning the reference test chart and the test chart.

In step S26, the optical properties of the scanning device are calibrated according to the corrected OD values I1 to I6. These optical properties include the luminance distribution property of the light source, the sensitivities of the image sensor of the scanner, or a combination thereof. With this calibration procedure, the images generated by the scanner are free from any distortion.

Using the method for calibrating the test chart of the invention can get rid of the conventional drawbacks, and the test chart of the invention can be applied to a calibration procedure of the sheet-fed scanner without hindrance. In return, the calibration of the optical property of the scanner could proceed with precision.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method of calibrating a test chart, the method comprising the steps of:
   scanning, by a reference scanning device, a plurality of reference blocks of a reference test chart to obtain a plurality of reference optical density (OD) values;
   scanning, by the reference scanning device, a plurality of blocks of the test chart to obtain a plurality of first OD values, wherein the blocks correspond to the reference blocks of the reference test chart; and
   obtaining a compensation function derived from respectively converting the first OD values into the reference OD values.

2. The method according to claim 1, wherein the reference blocks of the reference test chart are adhered to a base plate.

3. The method according to claim 1, wherein the blocks of the test chart are directly printed on a base plate.

4. The method according to claim 1, wherein the reference scanning device is one of a flatbed scanner and a sheet-fed scanner.

5. The method according to claim 1, wherein the scanning device is one of a flatbed scanner and a sheet-fed scanner.

6. The method according to claim 1, wherein the reference scanning device is a calibrated scanner.

7. A method of calibrating a scanning device, the method comprising the steps of:
   scanning, by the scanning device, a test chart to obtain a plurality of optical density (OD) values;
   converting the OD values into a plurality of corrected OD values according to a compensation function, wherein the compensation function is obtained by:
   scanning, by a reference scanning device, a plurality of reference blocks of a reference test chart to obtain a plurality of reference OD values;
   scanning, by the reference scanning device, a plurality of blocks of the test chart to obtain a plurality of first OD values, wherein the blocks correspond to the reference blocks of the reference test chart; and
   obtaining the compensation function derived from respectively converting the first OD values into the reference OD values; and
   calibrating an optical property of the scanning device according to the corrected OD values.

8. The method according to claim 7, wherein the reference scanning device is a calibrated scanner.

* * * * *